United States Patent [19]

Yamaguchi

[11] 4,237,494
[45] Dec. 2, 1980

[54] FACSIMILE SYSTEM

[75] Inventor: Shingo Yamaguchi, Kawasaki, Japan

[73] Assignee: Ricoh Company, Ltd., Tokyo, Japan

[21] Appl. No.: 59,478

[22] Filed: Jul. 20, 1979

[30] Foreign Application Priority Data

Jul. 20, 1978 [JP] Japan .................................. 53-87653

[51] Int. Cl.$^3$ ............................................ H04N 1/40
[52] U.S. Cl. .................................. 358/280; 358/256; 358/288
[58] Field of Search ............... 358/280, 288, 281, 285, 358/286, 260, 261, 256, 257

[56] References Cited

U.S. PATENT DOCUMENTS

| | | | |
|---|---|---|---|
| 3,706,842 | 12/1972 | Robertson | 358/281 |
| 3,723,640 | 3/1973 | Perreault | 358/288 |
| 3,800,080 | 3/1974 | Fuwa | 358/280 |
| 3,813,483 | 5/1974 | Kurosawa | 358/281 |
| 3,876,829 | 4/1975 | Schreiber | 358/285 |

*Primary Examiner*—Howard W. Britton
*Attorney, Agent, or Firm*—Oblon, Fisher, Spivak, McClelland & Maier

[57] ABSTRACT

In a facsimile system capable of performing the read scanning, record scanning and transmission processing of image element data line by line, a buffer apparatus on the transmission side stores therein the image element data obtained from a scanner in units of two lines and a buffer apparatus on the reception side applies the image element data therefrom to a printer in units of two lines, whereby the suspension time of a subscanning pulse motor is set equivalent to the minimum scanning time for two lines of the image element data.

7 Claims, 17 Drawing Figures

FACSIMILE SYSTEM

BACKGROUND OF THE INVENTION

The present invention relates to a facsimile system and more particularly to a facsimile system suitable for effecting subscanning using a motor, with improvement of the subscanning which is reinitiated after the suspension of read scanning or record scanning.

A conventional facsimile apparatus is constructed as shown in FIG. 1 (a) and FIG. 1 (b). Referring to FIG. 1 (a), image element data DI for each line, which are fed from a scanner 1, followed by a synchronizing pulse PI, are temporarily stored in a buffer apparatus 2. Then, in accordance with a data requesting pulse Po from a data compression apparatus 3, data Do for one line are applied from the buffer apparatus 2 to the data compression apparatus 3. The data compression apparatus 3 codes the data Do for one line accordance with the run length and when the thus coded data Do do not reach a predetermined number of bits, supplementary bits are added thereto by the data compression apparatus 3, whereby the data compression operation for one line is completed. When the data compression operation for one line has been completed, a pulse Po requesting the data for the next one line is applied to the buffer apparatus 2 and, at the same time, the compressed data are transmitted to the reception side through MODEM 4.

On the other hand, on the reception side, as shown in FIG. 1 (b), the data transmitted from the transmission side through MODEM 5 are fed to a data expansion apparatus 6, where the coded data are decoded in the form of original image element data D'I which are then stored in a buffer apparatus 7 line by line. Awaiting the accumulation of the image element data D'I in the buffer apparatus 7, a plotter 8 picks up the image element data D'I for one line from the buffer apparatus 7 and records the same.

Thus, an original sheet set on the transmission side is read by the scanner 1 and the read data are transmitted to the reception side, where the transmitted data are reproduced, by the plotter 8, on a recording paper set on the reception side. When compressed data are transmitted from the transmission side to the reception side, the data transmission time for one line is always set longer than the read and record time for one line in order to increase the transmission efficiency and to reduce the number of the necessary buffers on the reception side and to simplify the construction of the facsimile system.

The subscanning for effecting the read scanning and record scanning is performed using motors, particularly pulse motors 9 and 10, respectively. In other words, when the buffer apparatus 2 on the transmission side becomes empty, the pulse motor 9 is driven in accordance with the synchronizing pulse PI and the image element data DI for one line are read by the scanner 1, while moving the original sheet in the subscanning direction. On the reception side, when the image element data D'I for one line are accumulated in the buffer apparatus 7 and it becomes possible to pick up the image element data D'I therefrom, the pulse motor 10 is driven in accordance with a synchronizing pulse P'I and image element data D'I for one line are recorded by the plotter 8, while moving the recording paper in the subscanning direction.

Therefore, when the images of the original sheet are complicated and the number of bits of the compressed data for one line are great, a long time is required for the transmission processing and there is a waiting time for the read scanning and the record scanning. As a result, the read subscanning and the record subscanning are performed intermittently, so that the pulse motors 9 and 10 are frequently started and stopped in repetition.

Furthermore, as shown in FIG. 2, when the read scanning or record scanning for one line is completed at a time To and the next scanning is suspended, even if the application of the subscanning pulse to the pulse motors 9 and 10 is stopped, the motors 9 and 10 do not stop immediately and the hunting thereof occurs, since the pulse motors 9 and 10 have their own inertia, respectively.

When the read scanning or record scanning for the next line becomes possible during this hunting period of $\tau$, and the pulse motors 9 and 10 are started, the linearity of the subscanning is damaged so that uneven scanning is caused. Particularly when the scanning resumption period falls on a hunting period $\tau 1$ of the motors 9 and 10, the scanning position greatly deviates from a desired scanning position, so that a satisfactory image is not reproduced on the reception side.

In the conventional facsimile apparatus, the buffer apparatuses 2 and 7 are provided with buffers for three lines, to which the image element data are fed and from which the image element data are picked up line by line, whereby the reading and recording and transmission processing are also conducted line by line.

Therefore, the scanning suspending period $\tau s$ from the suspension of the read scanning or record scanning through the resumption of the scanning becomes shorter than the hunting period $\tau$ and a case frequently occurs where the next scanning is initiated while the hunting of the motors is taking place. This does not permit formation of good recording images.

To be more specific, on the transmission side, as shown in FIG. 3, the image element data DI1, DI2, and DI3 for each line are successively stored in the buffers A, B, and C of the buffer apparatus 2, respectively, as shown in FIG. 3 (b), in accordance with the synchronizing pulses PI1, PI2 and PI3 of FIG. 3 (a) from the scanner 1. When the image element data DI1, DI2 and DI3 for the three lines have been stored in the buffer apparatus 2, image element data DI4 of the fourth line cannot be fed to the buffer apparatus 2 until the buffer A becomes empty, so that the read scanning is suspended. When a data requesting pulse Po1 is produced from the data compression apparatus 3 as shown in FIG. 3 (c), the data Do1 of the buffer A are picked up by the data compression apparatus 3 as shown in FIG. 3 (d). When the run length coding of the image element data Do1 is effected successively and the data Do1 of the first line does not reach a predetermined number of bits and the transmission time for the one line does not reach a predetermined transmission time, the data compression apparatus 3 adds supplementary bits to the dtat Do1 of the first line to make the data Do1 a code having bits more than the predetermined number of bits for one line and feeds the data Do1 to the MODEM 4 and applies the next data requesting pulse Po2 to the buffer apparatus 2 when the coding has been completed. As a result, when the buffer A becomes empty, it becomes possible to store data in the buffer apparatus 2 from the scanner 1, so that the read scanning is resumed by the next synchronizing pulse PI5.

However, the transmission processing time for the stored image element data Do1 of the first line is short and there is only time τ equivalent to one line scanning time as the scanning suspension period from the completion of the read scanning of input image element data DI3 of the third line through the initiation of the read scanning of the next fourth line. Therefore, the period of resuming the read scanning falls on the reverse hunting period, τ1, so that the subscanning cannot be performed properly and desired image element data cannot be obtained as the data for the DI4 of the fourth line.

Furthermore, for the originals which tolerate low scanning line density, generally the transmission processing is performed, with the scanning line density reduced to ½, in order to increase the transmission efficiency per original sheet.

When this method is adopted in the conventional facsimile system, the read scanning and recording scanning speeds have to be made greater than the data transmission speed and accordingly the subscanning speed has to be doubled. In this case, the main scanning speed is usually doubled, but it does not necessarily follow that the main scanning speed has to be doubled. In particular, this applies to the scanner side. If only the subscanning is made rough on the reception side, the space between dots which form characters is broadened. This results in the characters appearing lightly printed. Therefore, the main scanning speed is generally doubled and writing is performed twice.

Therefore, the hunting period and amplitude of the motor are increased when the scanning is suspended, so that the linearity of the subscanning at the time of initiation of the scanning is further lowered in comparison with the case where the scanning line density is 1. Accordingly image quality if further lowered.

For the above-mentioned reasons, conventionally, a measure is taken to meet the situation at the time of resumption of the scanning by the use of a motor capable of producing a large torque. However, motors having large torques produce much noise when starting and generate much heat. Furthermore, in the conventional facsimile system, when the scanning line density is made rough, the frequency of the scanning pulse has to be changed in order to make the subscanning speed high, which requires complicated circuits.

SUMMARY OF THE INVENTION

It is therefore an object of the present invention to provide a facsimile system capable of starting a subscanning pulse motor again when the hunting period of the subscanning pulse motor, after the stopping of the subscanning pulse motor, has passed, whereby the subscanning performance of at least either the read scanning or the record scanning is improved.

Another object of the present invention is to provide a facsimile system which does not necessitate the changing of the read scanning speed and the record scanning speed when the scanning line density is reduced to ½ and which is capable of starting a subscanning pulse motor again when the hunting period of the subscanning pulse motor, after the stopping of the substanning motor, has passed, whereby the subscanning performance of the read scanning is improved.

In order to attain the above-mentioned first object, according to the present invention, in a facsimile system capable of performing the read scanning, record scanning and transmission processing of image element data in units of one line, the stopping period of at least one subscanning pulse motor for use in the read scanning and the record scanning is set so as to be equivalent to the minimum scanning time for two lines.

Furthermore, in order to attain the second object of the present invention, in a facsimile apparatus capable of performing the read scanning, record scanning and transmission processing of image element data, with units of one line, a buffer apparatus is constructed so as to store therein the image element data obtained from the scanner, always with units of 2 lines and applies the image element data therefrom to a data compression apparatus every other line. The transmission processing of the image element data is performed by the data compression apparatus, taking the time for two lines as a minimum data transmission processing time, whereby, when the scanning line density is reduced to ½, the stopping period of the subscanning pulse motor for the read scanning is set so as to be equivalent to the minimum scanning time for two lines.

BRIEF DESCRIPTION OF THE DRAWINGS

For a better understanding of the invention as well as the objects and other features thereof, reference will be made to the following detailed description which is to be read in conjunction with the drawings wherein.

DETAILED DESCRIPTION OF THE PREFERRED EMBODIMENTS

Referring to FIG. 4 through FIG. 13, the embodiments of the facsimile system according to the present invention will now be explained.

Before explaining the specific construction and operation of the embodiments according to the present invention, the outline of the embodiments will be explained by referring to FIG. 4 through FIG. 8.

Figure 1A:
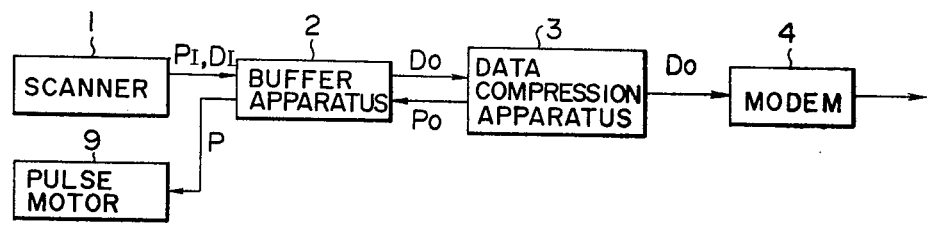
FIG. 1(a) is a block diagram of a conventional facsimile system on the transmission side.
Figure 1B:
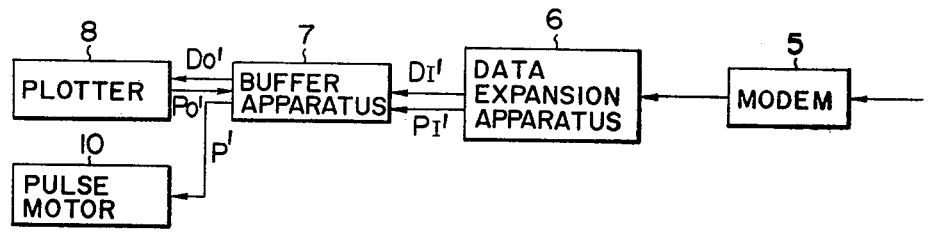
FIG. 1(b) is a block diagram of the conventional facsimile system on the reception side.
Figure 2:
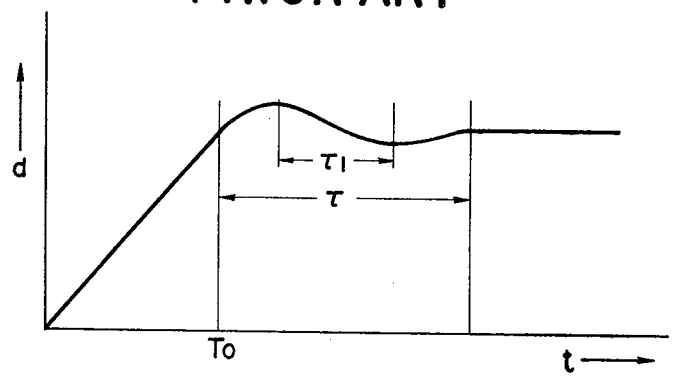
FIG. 2 shows the hunting state of a subscanning pulse motor when the subscanning pulse motor is stopped.
Figure 3:
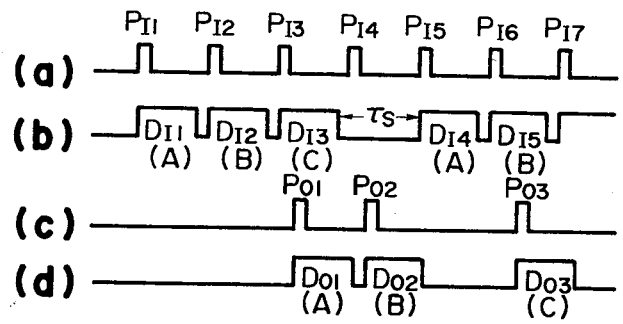
FIG. 3 shows the wave forms of the input and output signals of a buffer apparatus of the conventional facsimile system.
Figure 4:
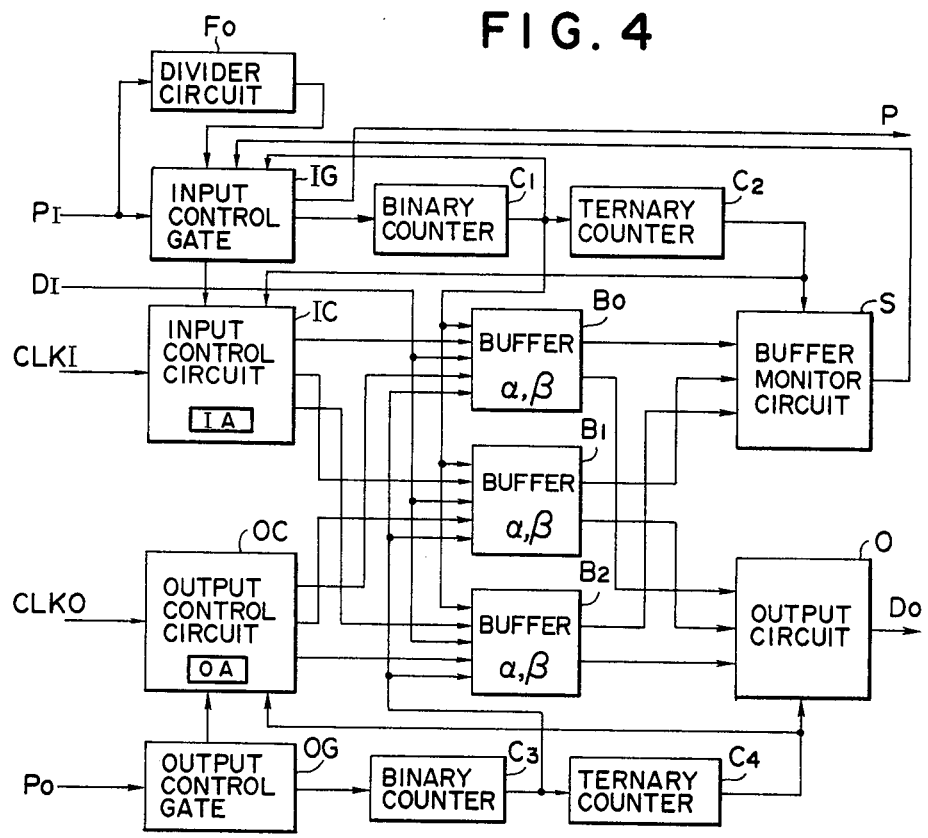
FIG. 4 is a block diagram of a buffer apparatus on the transmission side of a first embodiment of a facsimile system according to the present invention.

FIG. 4 is a block diagram of a buffer apparatus of the present invention which is inserted between a scanner (not shown) on the transmission side and a data compression apparatus (not shown). In the figure, B0, B1 and B2 represent buffers having memory portions $\alpha$ and $\beta$, respectively for storing image element data for two lines. The buffers B0, B1 and B2 are capable of writing therein and reading therefrom independently.

C1 represents a binary counter for choosing the memory portion $\alpha$ or the memory portion $\beta$ in accordance with the value of 0 or 1 when the image element data are fed to the buffer apparatus. C2 represents a ternary counter, whose increment is effected by the carry output of the counter C2 and which chosses the buffer B0, the buffer B1 or buffer B2 in accordance with the value of 0, 1 or 2 when the image element data are fed to the buffer apparatus. C3 and C4, respectively, represent a binary counter and a ternary counter for choosing the memory portion $\alpha$ or $\beta$, and the buffer B0, the buffer B1 or buffer B2 when the image element data are transmitted to the data compression apparatus.

S represents a buffer monitor circuit for monitoring the respective states of the buffers B0, B1 and B2 and for informing an input control gate IG whether or not it is possible to store the next image element data for one line in a predetermined buffer.

F0 represents a divider circuit for dividing a main scanning synchronizing pulse PI by $\frac{1}{2}$, which is sent from the scanner side and for applying the divided synchronizing pulse to the input control gate IG.

Signals from the divider circuit F0, the binary counter C1 and the buffer monitor circuit S, are applied to the input control gate IG. When the output of the divider circuit F0, is at "H" level and it is possible to feed image element data to a predetermined buffer or when the value of the binary counter C1 is zero (0), an input control circuit IC is actuated. At the same time, the synchronizing pulse PI is added to the binary counter C1.

The input control circuit IC has an input address counter IA whose increment is effected by a main scanning clock applied from the scanner side. When the input control circuit IC is actuated, the image element data DI for one line, which are fed from the scanner side, followed by the synchronizing pulse PI, are stored successively bit by bit in a predetermined memory portion of a buffer which is designated by the ternary counter C2, in accordance with an address of the input address counter IA in synchronism with an input clock CLKI.

OG represents an output control gate for applying a data requesting pulse P0 to the binary counter C3 and to an output control circuit OC. The data requesting pulse P0 is produced at the completion of the data transmission processing of one line in the data compression apparatus.

The output control circuit OC has an output address counter OA whose increment is effected by a data output clock CLKO which is generated from a clock generator. In the output control circuit OC, in accordance with the data requesting pulse P0 and the value of the ternary counter C4, a buffer (B0, B1 or B2) is designated and from a memory portion ($\alpha$ or $\beta$) of the buffer designated by the binary counter C3, the stored image element data are fed bit by bit to the data compression apparatus through an output circuit 0 in accordance with the address of the output address counter OA.

Based on the construction of the buffer apparatus on the transmission side of the thus constructed facsimile apparatus, the operation of the facsimile apparatus will now be explained by referring to a time chart of FIG. 5.

Figure 5:
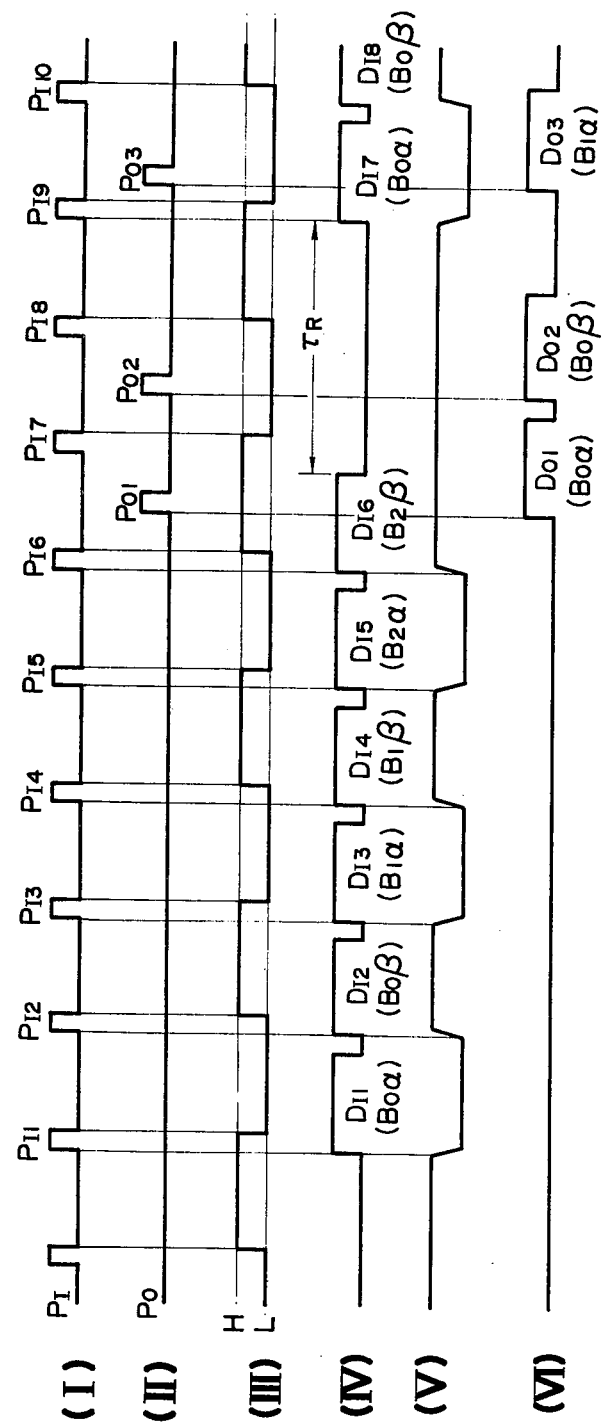
FIG. 5 shows the wave forms of signals in each portion of the buffer apparatus of FIG. 4.

In FIG. 5, wave form (I) indicates the main scanning synchronizing pulse PI; wave form (II) indicates the data requesting pulse P0; wave form (III) indicates the output of the divider circuit F0; wave from (IV) indicates the input operation of the data for one line applied to the buffer; wave form (V) indicates the output of the binary counter C1; and wave form (VI) indicates the output operation of the data for one line from the buffer.

Initially, the counters C1, C2, C3 and C4 are set at their respective maximum values and the buffers B0, B1 and B2 are all empty.

As shown in FIG. 5 (I), the main scanning synchronizing pulse PI is continuously fed from the scanner and accordingly the divider output (III) is always produced from the divider circuit F0.

At this time, since the count value of 2 is applied to the buffer monitor circuit S from the ternary counter C2, the buffer monitor circuit S monitors whether or not it is possible to feed the next image element data for one line to the buffer B0, namely whether or not the buffer B0 is empty and the monitored result of the buffer monitor circuit S is applied to the input control gate IG.

Therefore, the input control gate IG actuates the input control circuit IC in synchronism with a main scanning synchronizing pulse PI1, based on the "H" output signal of the divider circuit F0 and on the signal from the buffer monitor circuit S, which indicates that input to the buffer B0 is possible. Furthermore, the input control gate IG makes the value of the counter C1 zero (0) by applying the synchronizing pulse PI1 to the counter C1 and, at the same time, the input control gate IG makes the value of the counter C2 zero (0) by the carry output of the counter C1. As a result, it becomes possible to feed the image element data to the memory portion $\alpha$ of the buffer B0. At the same time, a drive signal P is produced from the input control gate IG and is applied to a subscanning pulse motor, so that the read scanning is initiated.

When the input control circuit IC is actuated, the increment of the input address counter IA of the input control circuit IC is immediately effected successively by the main scanning clock CLKI sent from the scanner and in accordance with the address of the input address counter IA, the image element data DI1 for one line are successively stored bit by bit in the memory portion $\alpha$ of the buffer B0, namely (B0 $\alpha$) as shown in FIG. 5 (IV).

When all the image element data DI1 for one line have been stored in (B0$\alpha$), the next synchronizing pulse PI2 is sent from the scanner.

At this moment, since "0" is applied from the binary counter C1 to the input control gate IG, the input control circuit IC is continuously actuated by the synchronizing pulse PI applied to the input control gate IG and accordingly, the subscanning is also continued. The synchronizing pulse PI2 is also applied to the binary counter C1, making the value of the binary counter C1 one (1). As a result, it becomes possible to feed the image element data DI2 for the next line to the memory portion $\beta$ of the buffer B0, namely (B0$\beta$).

Therefore, after the input address counter IA of the input control circuit IC is once reset by the synchronizing pulse PI, the increment thereof is effected again by the main scanning clock CLKI which is continuously sent from the scanner and in accordance with the address of the input address counter IA, the image element data DI2 for the second line are stored in (B0$\beta$).

When the image element data DI2 for the second line have been stored in (B0$\beta$), the value of the binary counter C1 is one (1). However, the output of the divider circuit F0 is at "H" level and to the buffer monitor circuit S, there is applied the value of 1 of the ternary counter C2 and it is possible to feed the next image element data DI3 to the buffer B1. Therefore, when the next synchronizing pulse PI3 is applied to the input control gate IG, the input control gate IG continuously actuates the input control circuit IC and the subscanning pulse motor, so that the image element data DI3 obtained from the scanner are stored in the memory portion $\alpha$ of the buffer B1.

Hereafter, based on the synchronizing pulse PI4, PI5 and PI6, the image element data DI4, DI5 and DI6 are stored in the same manner in (B1$\beta$), (B2$\alpha$) and (B2$\beta$) respectively, and when the image element data DI6 are stored in the memory portion $\beta$ of the buffer B2, it becomes impossible to feed the next image element data DI7 to the buffer B0 since the buffer B0 is occupied. As a result, even if the next synchronizing pulse PI7 is applied to the input control gate IG, the input control circuit IC is not actuated and the read scanning is suspended. The scanning suspension period continues until the image element data for two lines are picked up from the buffer B0, or at least for the period of the scanning time for two lines.

For instance, if a data requesting pulse P01 is applied to the output control gate OG, when the image element data DI6 of the sixth line from the data compression apparatus are being stored in (B2$\beta$) the values of the counters C3 and C4 are immediately made zero (0) by the pulse P01, so that the memory portion $\alpha$ of the buffer B0 is designated and the increment of the output address counter OA of the output control circuit OC is successively effected by the output clock CLKO produced from the clock generator. As a result, the image element data D01 stored in (B0$\alpha$) are fed bit by bit to the data compression apparatus through the output circuit O in accordance with the address of the output address counter OA.

In the data compression apparatus, when the image element data D0 for one line have been coded in the run length and the coding processing of the one line has been completed, the data requesting pulse P02 for processing the next image element data is generated.

In accordance with the pulse P02, the image element data D02 of the second line are applied from (B0$\beta$) to the data compression apparatus and, at that moment, input of the image element data to the buffer B0 becomes possible. This is monitored by the buffer control circuit S and the result is conveyed to the input control gate IG, whereby the subscanning pulse motor is driven by the synchronizing pulse PI9 which is fed at the moment to the input control gate IG and, at the same time, the input control circuit IC is actuated, so that the image element data are again stored in the buffer B0.

Thus, on the transmission side, the application of image element data to each buffer (B0, B1, B2) is performed in two line units. Therefore, since the scanning suspension period $\tau_R$ from the suspension of read scanning to the resumption of the scanning is longer than the minimum scanning time for two lines, namely $\tau_R > \tau$, the read scanning is resumed without fail after the hunting period of the motor has passed, so that the subscanning at the resumption of the scanning is improved. The above is the outline of the operation on the transmission side.

Figure 6:
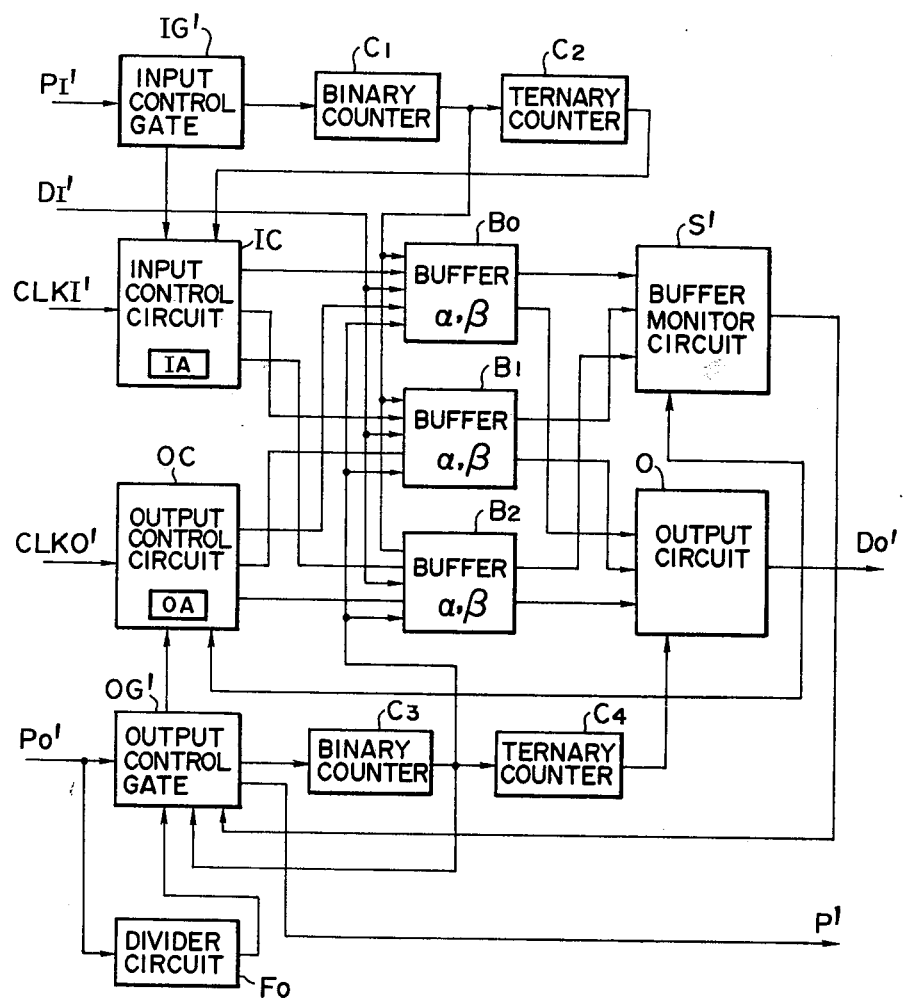
FIG. 6 is a block diagram of a buffer apparatus on the reception side of the first embodiment of the facsimile system of FIG. 4.

Referring now to FIG. 6, the outline of the operation of the reception side will be explained.

FIG. 6 is a block diagram of a buffer apparatus on the reception side. The differences between the construction of the buffer apparatus of FIG. 4 and that of the buffer apparatus of FIG. 6 are as follows:

In the buffer apparatus of FIG. 6, the image element data sent from a data expansion apparatus (not shown) are unconditionally applied to the buffer apparatus and in applying the image element data to a printer (not shown) from the buffer apparatus, if the image element data for two lines have been accumulated in each buffer, the image element data are applied to the printer. Therefore, the input control gate IG and the output control gate OG of FIG. 4 are reversed in the position in FIG. 6, employing an input control gate IG' and an output control gate OG'. Furthermore, when the image element data are picked up from a buffer and applied to the printer, a buffer monitor circuit S' monitors whether or not the image element data for two lines to be picked up are stored in the buffer and the monitored result is conveyed to the output control gate OG'. Furthermore, the input control circuit IC is designated so as to store the image element data in a predetermined buffer in accordance with a signal from the input control gate IG' and an output value from the counter C2. The output control circuit OC is designed so as to apply the image element data which are stored in a predetermined buffer to the printer in accordance with a signal from the output control gate OG' and an output value from the counter C4. The counters C1 through C4, the buffers B0 through B2, and the output circuit O are the same as or equivalent to those in FIG. 4.

When an input start pulse PI' is applied from a data expansion apparatus (not shown) to the input control gate IG', the input clock CLKI' is counted by an input address counter IA of the input control circuit IC and the image element data DI', which have been expanded by the data expansion apparatus, are successively stored bit by bit in the memory portion $\alpha$ or $\beta$, designated by the counter C1, of a buffer designated by the counter C2, in accordance with the address of the input address counter IA.

By repeating this operation, the image element data for one line are successively stored in the memory portion $\alpha$ of the buffer B0, then in the memory portion $\beta$ of the buffer B0, then in the memory portion $\alpha$ of the buffer B1, then in the memory portion $\beta$ of the buffer B1 and so on.

When the image element data for two lines are stored in a predetermined buffer and it becomes possible to apply the image element data to the printer, the buffer monitor circuit S' monitors the condition and conveys the monitored result to the output control gate OG', so that the output control gate OG' actuates the output control circuit OC in accordance with a main scanning synchronizing pulse P0' sent from the printer. The output clock CLKO' is counted by the output address counter OA and the image element data are successively applied to the printer from the memory portion α or β of a predetermined buffer designated by the counters C3 and C4, in accordance with the address of the output address counter OA. At this moment, a drive signal P' is applied to a subscanning pulse motor of the printer in accordance with the main scanning synchronizing pulse P0', whereby the record scanning is effected.

As in the case of the previously mentioned input operation on the transmission side, when the count value of the binary counter C3 is made zero (0) by applying the count value of zero of the binary counter C3 to the output control gate OG', the output control circuit OC is actuated without fail by the application of the synchronizing pulse P0' thereto. Therefore, the data output from the buffer apparatus to the printer is effected in two line units.

When the next image element data for two lines to be applied to the printer are not stored in a predetermined buffer during the process of applying successively the image element data in two line units to the printer from the buffer B0, then from B1 and then from B2, the record scanning is suspended at the moment.

The suspension of the record scanning continues until the image element data for two lines are stored in a buffer from which the image element data are to be picked up. The minimum suspension time $\tau_R$ is longer than the suspension of the read scanning of the buffer apparatus on the transmission side, which has been explained in reference to the time chart of FIG. 5.

As a result, also in the case of the record scanning, the resumption of the scanning after the suspension of the scanning comes after the hunting period of the motor, so that the subscanning at the time of resumption of the scanning is improved.

Figure 7:
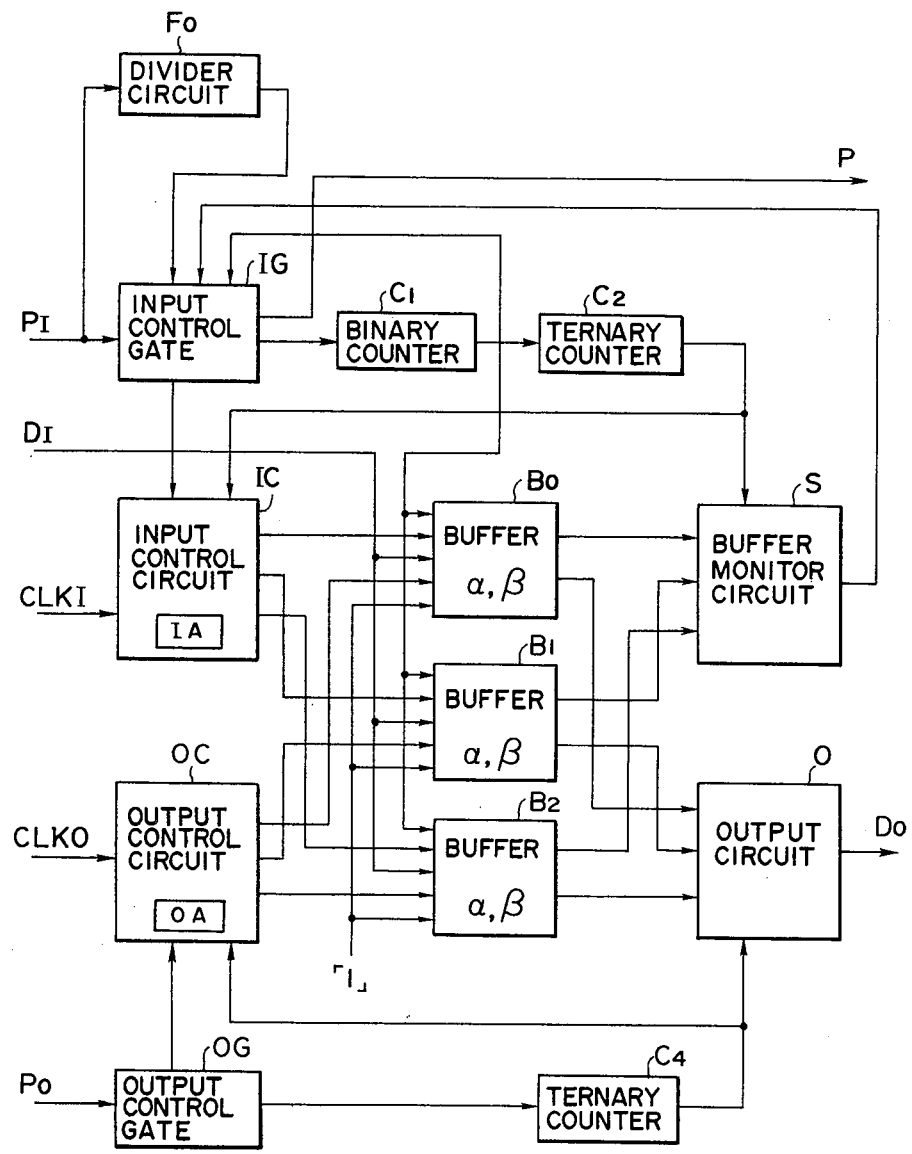
FIG. 7 is a block diagram of a buffer apparatus on the transmission side of a second embodiment of a facsimile system according to the present invention.

When the scanning line density is reduced to ½, the construction of the buffer apparatus on the transmission side is changed in such a manner that the counter C3 is FIG. 4 is removed and the output of the output control gate OG is directly applied to the ternary counter C4 and "1" is fed to each of the buffers B0 through B2 as shown in FIG. 7.

In the thus constructed buffer apparatus, the operation of storing the image element data read by the scanner in each buffer is exactly the same as the operation which has been explained by referring to FIG. 4.

The operation of applying the image element data from the buffer apparatus to the data compression apparatus is as follows:

Since "1" is always applied to the buffers B0 through B2, the memory portion β is always designated in each buffer. When a data requesting pulse P0 is applied to the output control gate OG, the image element data are successively applied bit by bit by the output control circuit OC to the data compression apparatus from the memory portion β of a predetermined buffer, for example, the buffer B0, namely (B0β) in accordance with the address of the output address counter OA.

At this moment, in the data compression apparatus, the image element data for one line picked up from the memory portion (B0β) are subjected to the data compression processing, taking the transmission processing time for two lines, whereby the next data requesting pulse is applied to the buffer apparatus with an interval longer than the minimum read scanning time for two lines.

As mentioned previously, during the process of applying the image element data successively from the memory portion β of each buffer to the data compression apparatus the pick-up of the image element data from the memory portion α of each buffer is skipped, while the image element data for two lines each from the scanner is stored in each buffer. When the input to the buffer apparatus catches up with the output from the buffer apparatus, the input to the buffer apparatus or the read scanning is suspended.

The suspension time is longer than the minimum read scanning time for two lines since the time equivalent of the two line processing time is taken in the above-mentioned transmission processing.

Namely, by the time the image element data are applied from the memory portion β of a predetermined buffer to the data compression apparatus after the termination of the suspension of the read scanning, and application of the image element data to the predetermined buffer becomes possible and the read scanning is initiated in accordance with the main scanning pulse PI, the period of time equivalent to the minimum read scanning time for two lines has passed. Thus, the subscanning pulse motor is driven again after the hunting period thereof has passed, whereby the subscanning at the time of the resumption of the scanning is improved.

Figure 8:
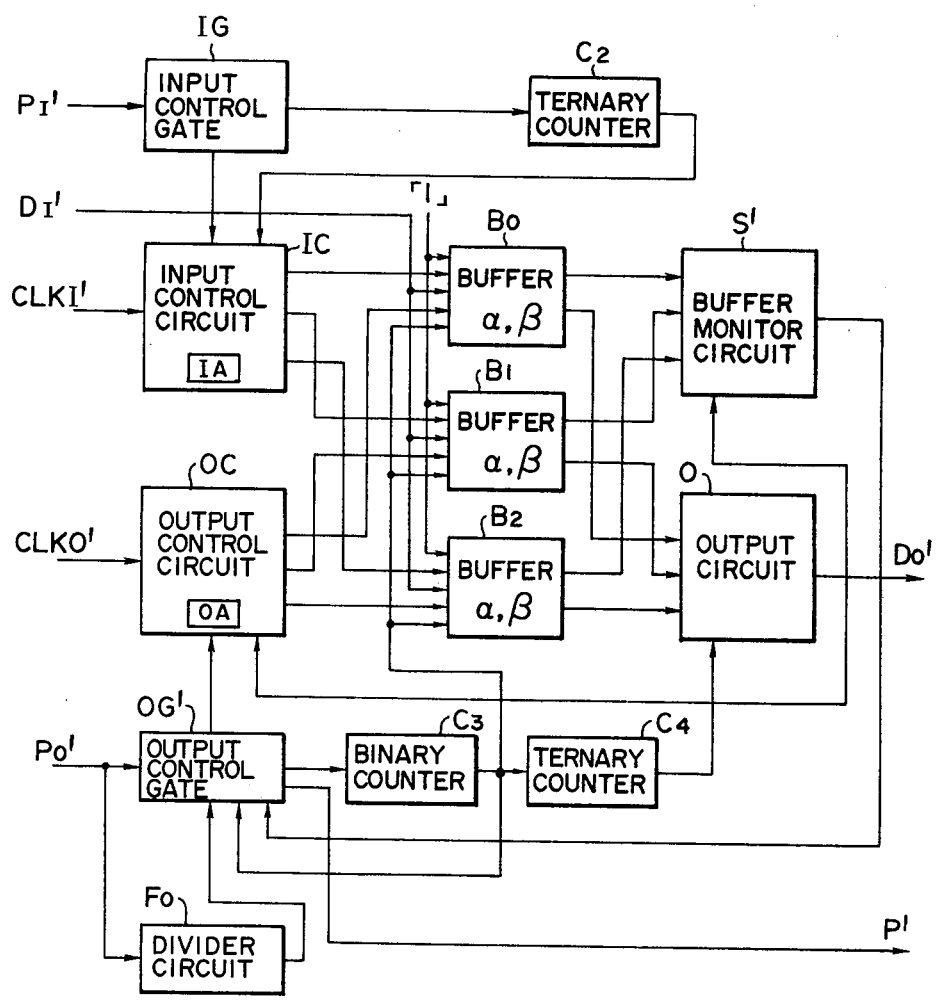
FIG. 8 is a block diagram of a buffer apparatus on the reception side of the second embodiment of a facsimile system according to the present invention.

The compressed data picked up from the transmission side on every other line, taking a time equivalent to the transmission processing time for two lines, are transmitted to the reception side and stored in each buffer of the buffer apparatus on the reception side as shown in FIG. 8 through a data expansion apparatus (not shown).

FIG. 8 is a block diagram of the buffer apparatus on the reception side when the scanning line density is reduced to ½. In the figure, the same reference symbols as those in FIG. 6 indicate the same or equivalent members or apparatuses as those in FIG. 6. The differences between the construction of the buffer apparatus of FIG. 6 and that of the buffer apparatus of FIG. 8 are as follows:

In the buffer apparatus of FIG. 8, the binary counter C1 of FIG. 6 is eliminated and an input start pulse PI' is directly applied from the input control gate IG' to the ternary counter C2. When the image element data are applied to the buffer apparatus, the image element data D'I are always stored in the memory portion β of each of the buffers B0 through B2. Therefore, "1" is applied to each of the buffers B0 through B2. The construction of each of the buffers B0 through B2 is such that when the image element data are picked up from the buffer apparatus, the memory portion β of each of the buffers B0 through B2 is designated regardless of the output value of the binary counter C3.

In the thus constructed buffer apparatus on the reception side, when the input start pulse P'I is produced from a data expansion apparatus (not shown), the input control circuit IC is actuated and an input clock CLKI' is counted by the input address counter IA of the input control circuit IC and in accordance with the address of the input address counter IA, the image element data D'I are stored successively bit by bit in the memory portion β of the buffer B0, namely (B0β) which is designated by the ternary counter C2.

When the image element data D'I for one line have been completely stored in the buffer (B0β), the image element data D'I, followed by the next input start pulse P'I, are stored in the buffer (B1β) and the next image element data D'I are then stored in the buffer (B2β).

The monitor circuit S' monitors that the image element data have been stored in the memory portion β of a predetermined buffer. In accordance with the main scanning synchronizing pulse P'0 produced from a printer (not shown), the output control circuit OC is actuated and the output clock CLKO' is counted by the output address counter OA of the output control circuit OC. In accordance with the address of the output address counter OA, the image element data are applied from a buffer designated by the ternary counter C4 to the printer. At this time, the same image element data for two lines are applied to the printer and the same image element data are written twice, since the buffers B0 through B2 are constructed so as to feed the image element data always from the memory portion β regardless of the value of the binary counter C3.

As in the case of the scanning line density of 1 which has been explained in FIG. 6, the minimum suspension time of the record scanning is always longer than the record scanning time for two lines in this case, since the image element data are stored in the memory portion β of each buffer, taking a time equivalent to the processing time for two lines.

Thus, even in the case where the scanning line density is reduced to ½, the scanning can be performed without changing the read scanning speed and the record scanning speed at all. The scanning suspension period can be provided so as to be equal to the scanning time for two lines, without increasing the hunting period and amplitude of the subscanning pulse motor during the suspension of the scanning so that the subscanning is improved.

One embodiment of a facsimile system according to the present invention is constructed and operates as mentioned above.

Referring now to FIG. 9 through FIG. 16, the embodiment will be explained in more detail.

Figure 9:
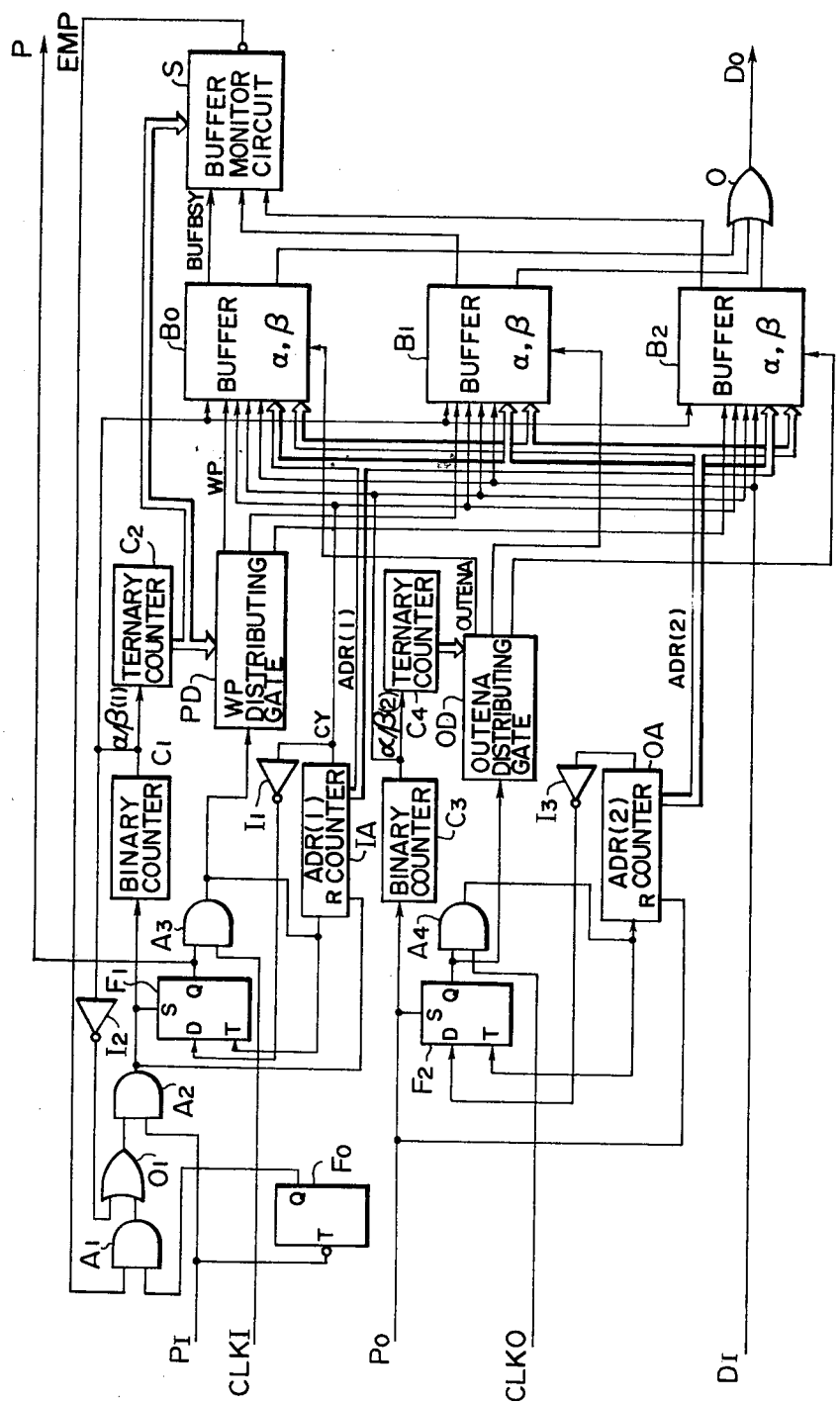
FIG. 9 is a more specific block diagram of the buffer apparatus on the transmission side of FIG. 4.

FIG. 9 is a block diagram of the buffer apparatus on the transmission side. In the figure, the same reference symbols as those in FIG. 4 indicate the same or equivalent members or apparatuses as those in FIG. 4.

Figure 10:
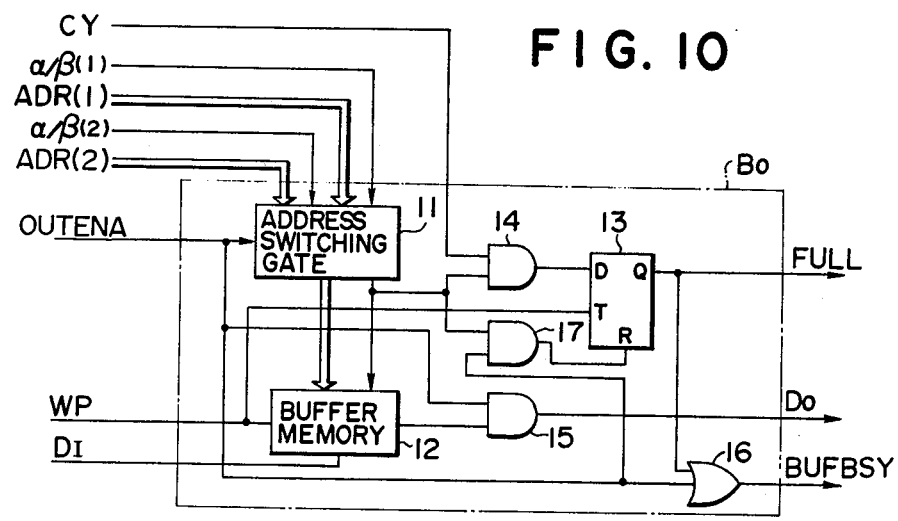
FIG. 10 is a more specific block diagram of a buffer B0 of the buffer apparatus of FIG. 9.

As shown in FIG. 10, the buffer B0 comprises an address switching gate 11, the buffer memory for two lines 12, a flip-flop 13, AND gates 14, 15 and 17, and OR gate 16.

The address switching gate 11 supplies the address of the buffer memory 12. In the input mode in which the buffer memory 12 stores therein the image element data from a scanner (not shown), access to the address is obtained by the output of α/β (1) of the binary counter C1 of FIG. 9 and by the input address of ADR (1) of the input address counter IA. In the output mode of applying the image element data stored in the buffer memory 12 to a data compression apparatus (not shown), access to the address is obtained by the output of α/β (2) of the binary counter C3 and by the output address of ADR (2) of the output address counter OA.

Therefore, the output of each of the binary counter C1, the input address counter IA, the binary counter C3 and the output address counter OA is applied to the address switching gate 11 and normally the address of the input address counter IA is applied to the memory 12. However, when the Q output of the flip-flop F2 (refer to FIG. 9) becomes "1" and an output enable signal OUTENA is applied to the address switching gate 11 through an output enable distributing gate OD in the output mode, the address switching gate 11 is switched so that the address of the output address counter OA is applied to the buffer memory 12.

The buffer memory 12 is a RAM having a memory capacity of two lines and in the previously mentioned input mode, the image element data DI are stored in the buffer memory 12 in accordance with a memory write pulse WP fed from a memory write pulse distributing gate PD which will be described in detail.

In the output mode in which the output enable signal OUTENA is given, the memory 12 applies the image element data stored therein to the data compression apparatus through the AND gate 15.

As mentioned previously, the address of the buffer memory 12 is switched by the address switching gate 11 in the input mode and the output mode. In the present embodiment, a random access memory RAM of 4096 bits×1 is employed as the buffer memory 12 and the upper most bit MSB of the address is used for line switching. In storing the image element data for two lines, the addresses between 0 and 2047 are employed as the memory portion α for the first line and the addresses between 2048 and 4095 are employed as the memory portion β for the second line. In the input mode, the designation of the memory portions α and β is made by the binary counter C1 and in the output mode, the same is made by the binary counter C3. Designation of each of the addresses from 0 to 2047 or from 2048 to 4095 is made by the input address counter IA in the input mode and by the output address counter OA in the output mode.

The flip-flop 13 sets up a flag indicating that the image element data for two lines are stored in the buffer memory 12 and that the stored image element data are not yet picked up therefrom.

The output of the AND gate 14 is "1" at the termination of the input mode of the memory portion β. The flip-flop 13 is set by the rear edge of the write pulse WP fed at this time. When the output mode is initiated, the flip-flop 13 is reset by the output of the AND gate 17 in accordance with the output enable signal OUTENA.

An OR gate 16 produces a buffer busy output BUFBSY when the buffer memory 12 is feeding the stored image element data therefrom or when the buffer memory 12 is full and the input of a new line cannot be accepted.

The buffer B0 is constructed as mentioned above and the other buffers B1 and B0 have the same construction as that of the buffer B0.

Referring to FIG. 9, a flip-flop F0 is a binary flip-flop which is actuated by the rear edge of the main scanning synchronizing pulse PI. When the Q output of the flip-flop F0 is "1" and the output of the buffer monitor circuit S is "1", namely in the buffer empty state, the output of the AND gate A1 becomes "1", which opens the gate of an AND gate A2 through an OR gate O1. The main scanning synchronizing pulse PI is then applied to the flip-flop F1, the binary counter C1 and the input address counter IA, whereby the input mode is initiated.

The OR gate O1 opens the AND gate A2 and initiates the input mode for two lines at a time not only under the above-mentioned condition, but also when the output of the binary counter C1 is zero (0), namely when the storing of one of the two lines in each buffer has been completed (for instance, when the image element data are stored in the memory portion α, but the storing of image element data in the memory portion β is not finished).

The flip-flop F1 sets up a flag indicating the duration of the operation of the input mode and the flag is used as an enable signal of the subscanning.

The subscanning is effected only when the Q output of the flip-flop F1 is "1".

An AND gate A3 is a gate for applying the main scanning clock CLKI to the input address counter IA, the memory write pulse distributing gate PD and the flip-flop F1.

The binary counter C1 designates a memory portion α or β for two lines of each of the buffers B0 through B2 to which the image element data are to be applied. In other words, when the value of the binary counter C1 is zero (0), the memory portion α is designated and when the value of the binary counter C1 is 1, the memory portion β is designated.

The output of the binary counter C1 is applied to the OR gate O1 through an inverter I2 and is used to initiate the input mode in accordance with the main scanning synchronizing pulse PI at the value of zero (0) of the binary counter C1 as mentioned previously.

The ternary counter C2 designates the buffer of the buffers B0 through B2 in which the image element data are to be stored. The output of the ternary counter C2 is applied to the memory write pulse distributing gate PD and the buffer monitor circuit S.

Figure 11:
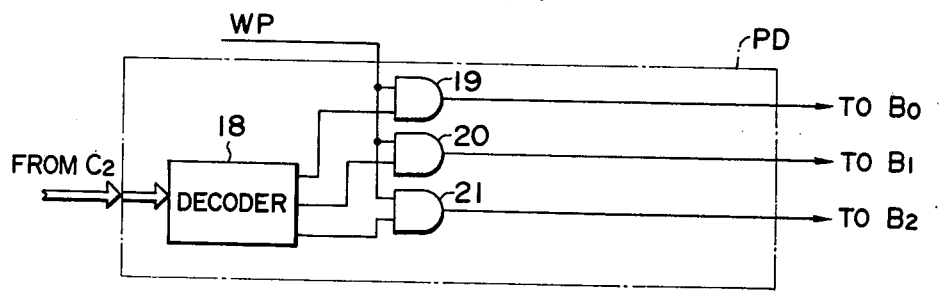
FIG. 11 is a more specific block diagram of a memory write pulse distributing gate PD of FIG. 9.

The memory write pulse distributing gate PD is constructed as shown in FIG. 11.

The memory write pulse distributing gate PD comprises a decoder 18 and AND gates 19, 20 and 21. The gate PD distributes the memory write pulse WP, which is designated in accordance with the value of the ternary counter C2, to each buffer. The memory write pulse WP is applied to the buffer B0 when the value of the ternary counter C2 is zero (0), to the buffer B1 when its value is one (1), and to the buffer B2 when its value is two (2).

Figure 12:
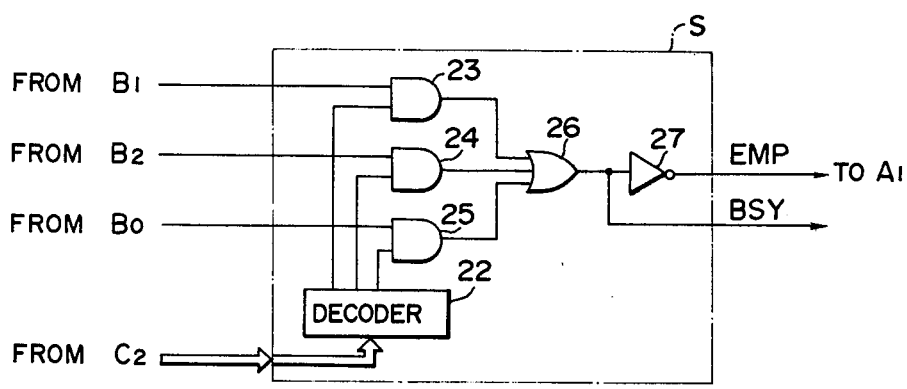
FIG. 12 is a more specific diagram of a buffer monitor circuit S of the buffer apparatus of FIG. 9.

The buffer monitor circuit S is constructed as shown in FIG. 12. The buffer monitor circuit S comprises a decoder 22, AND gates 23, 24 and 25, an OR gate 26 and an inverter 27. The buffer monitor monitors whether or not the buffer designated in accordance with the value of the ternary counter C2 produces a busy signal BUFBSY. The reversed output of the buffer monitor circuit S is applied to the AND gate A1 as a signel of buffer empty EMP.

For instance, when the value of the ternary counter C2 is zero (0), namely when the buffer, to which the image element data are being applied, or the buffer, to which the image element data were applied previously and which is now in the termination of the input mode, is B0, the next buffer to which the image element data are to be applied has to be B1. Therefore, the buffer monitor circuit S monitors whether or not the buffer B1 is producing its BUFBSY output. Likewise, when the value of the ternary counter C2 is 1, the buffer monitor circuit S monitors the BUFBSY output of the buffer B2 and when the value of the ternary counter C2 is 2, the buffer monitor circuit S monitors the BUFBSY output of the buffer B0.

The input address counter IA designates the address of each buffer in the input mode. An input address ADR (1) of the input address counter IA is applied to the address switching gate 11 of each of the buffers B0, B1 and B2.

The input address counter IA is reset by the main scanning synchronizing pulse PI at the beginning of the input mode and thereafter the increment of the input address counter IA is effected by the rear edge of the main scanning clock CLKI during the input mode operation.

The flip-flop F2 sets up a flag indicating the duration of the output mode. This flag is set by the data requesting pulse P0 from the data compression apparatus and is reset by a carry output generated from the output address counter OA when all the data for one line have been applied to the data compression apparatus.

An AND gate A4 is a gate for applying the data output clock CLKO to the output address counter OA and to the flip-flop F2 during the output mode operation.

When a carry output is generated from the output address counter OA at the last bit in the output mode, the carry output is inverted by an inverter I3 and is applied to the D input of the flip-flop F2 and at the next bit of the data output clock CLKO, the flip-flop F2 is triggered and reset.

The binary counter C3 is a counter for designating the memory portion α or β of each buffer for two lines in the output mode and the ternary counter C4 designates one of the buffers B0 through B2 in the output mode. The respective operations of the binary counter C3 and the ternary counter C4 in the output mode are almost the same as their operations in the input mode.

The output address counter OA designates the readout address of the buffers B0 through B2 during the output operation.

The address counter OA is reset at address zero (0) in accordance with the data requesting pulse P0 from the data compression apparatus and the increment of the address of the output address counter OA is effected one by one each time one bit of the image element data is read by the data output clock CLKO.

The construction of an output enable distributing gate OD is exactly the same as that of the memory pulse distributing gate PD as shown in FIG. 11.

The output enable distributing gate OD distributes an output enable signal OUTENA to a buffer designated by the ternary counter C4 when the flip-flop F2 is set so that its Q output becomes "1", namely in the output mode.

The OR gate O picks up a data ouput from one of the buffers B0 through B2 in the output mode and applies the same to to the data compression apparatus.

Referring to the time chart of FIG. 5, the operation of a facsimile apparatus on the transmission side, whose buffer apparatus is constructed as mentioned above, will now be explained in detail.

In the beginning, the flip-flops F1 and F2, the buffers B0 through B2, and the flip-flop 13 in each of the buffers B0 through B2 are set so that the Q output is zero (0).

The binary counters C1 and C3 and the ternary counters C2 and C4 are all reset at their respective maximum values. In other words, the binary counters C1 and C3 are set at 1, and the ternary counters C2 and C4 are set at 2.

When the main scanning synchronizing pulse PI is applied as shown in FIG. 5 (I), the flip-flop F0 is reversed in repetition by the rear edge of the main scanning synchronizing pulse PI and the Q output becomes as shown in FIG. 5 (III).

In the initial state where the initial resetting is released, since the maximum value of the ternary counter C2 is 2, the buffer monitor circuit S monitors whether or not the buffer B0 is busy. Since the flip-flop 13 within the buffer B0 is reset, the output of the buffer monitor circuit S is in the buffer empty state and "1" is applied to the AND gate A1. At this moment, if the Q output of the flip-flop F0 is "1", the output of the AND gate A1 becomes "1" so that the AND gate A2 is opened.

As shown in FIG. 5, when the main scanning synchronizing pulse PI1 is sent from the scanner at this moment, the main scanning synchronizing pulse PI1 passes through the AND gate A2 and resets the flip-flop F1 and, at the same time, the increment of the binary counter C1 is effected and the input address counter IA is reset.

When the increment of the binary counter C1 is effected, the value of the binary counter C1 is returned to zero (0) from the value of 1. By this change, the increment of the ternary counter C2 is also effected so that the value of the ternary counter C2 is returned to zero (0) from the value of 2.

Therefore, in the input mode, the memory portion $\alpha$ of the buffer B0 is designated by the binary counter C1 and the ternary counter C2.

By the change of the value of the binary counter C1 from 1 to zero (0), the output of the inverter I2 becomes "1" and the output of the OR gate O1 also becomes "1", so that the AND gate A2 is continuously opened and set ready for accepting the next main scanning pulse PI2 as the initiation pulse of the input mode.

FIG. 5 (V) shows the operation of the binary counter C1. When the flip-flop F1 is set by the main scanning synchronizing pulse PI1 and the Q output of the flip-flop F1 becomes "1", the AND gate A3 applies the main scanning clock CLKI to the memory write pulse distributing gate PD.

Since the value of the ternary counter C2 is zero (0), the memory write pulse distributing gate PD sends the write pulse WP to the buffer B0.

Since the output enable signal OUTENA is not applied to the address switching gate 11 of the buffer B0, the output of $\alpha/\beta$ (1) of the binary counter C1 and the output of ADR (1) of the input address counter IA are applied to the buffer memory B0.

Since the value of the binary counter C1 is zero (0), access to the memory portion $\alpha$ of the buffer memory 12 for one line is obtained and since the input address counter IA is reset and in the state of zero (0), the address zero (0) is indicated.

Therefore, when the memory write pulse WP is applied to the buffer B0 by the memory write pulse distributing gate PD, the image element data are stored in the address zero (0) of the buffer (B0$\alpha$).

The increment of the input address counter IA is effected by the rear edge of the main scanning clock CLKI and the address 1 is designated. Accordingly, the next image element data are stored in the address 1 in accordance with the next write pulse WP.

Thus, the image element data for one line from the scanner are successively stored in the buffer (B0$\alpha$).

During the generation of the final one bit for storing the image element data for one line, a carry output is produced from the input address counter IA, which is inverted by the inverter I1 and applied to the D output of the flip-flop F1. Therefore, the Q output of the flip-flop F1 becomes zero (0) at the generation of the final bit, whereby the input operation for one line is terminated. The above-mentioned carry output is applied to the AND gate 14 within the buffer B0. However, since one gate input of the AND gate 14 is zero (0) when the buffer (B0$\alpha$) is in operation, the flip-flop 13 is not set by the carry output.

When the input of the image element data to the buffer (B0$\alpha$) is completed and the main scanning synchronizing pulse PI2 of FIG. 5 is sent, the value of the binary counter C1 is zero (0) and the AND gate A2 is opened. Therefore, the flip-flop F1 is set again by the main scanning synchronizing pulse PI2 and the increment of the binary counter C1 is effected to 1 and the input address counter IA is reset.

In this new input mode, the output of the binary counter C1 becomes 1 and the increment of the ternary counter C2 is not effected and the output of the ternary counter C2 is zero (0), so that the buffer (B0$\beta$) is designated.

Namely, since the output of the binary counter C1 is 1, MSB of the buffer memory within the buffer B0 becomes "1" and access to the memory portion $\alpha$ is obtained.

Thus, the image element data for one line are stored in the buffer (B0$\beta$), and its memory operation is the same as that of the previously mentioned buffer (B0$\alpha$).

When the storing of the image element data in the buffer (B0$\beta$) comes to the final bit, the flip-flop F1 is reset by the next main scanning clock CLKI in accordance with a carry output CY of the input address counter IA.

At this moment, the carry output CY is also applied to the AND gate 14 of the buffer B0. Since the other output of the AND gate 14 is "1" when the buffer (B0$\beta$) is chosen, the flip-flot 13 is reset by the rear edge of the final write pulse WP and the Q output of the flip-flop 13 becomes "1" and the BUFBSY output of the buffer B0 is "1".

When the storing of the image element data in the buffer (B0$\beta$) has been completed, the binary counter C1 indicates the value of 1 and the ternary counter C2 indicates the value of zero (0).

Since the output of the binary counter C1 has been inverted by the inverter I2, the output of the inverter I2 is "0".

On the other hand, the buffer monitor circuit S monitors the buffer B1 to which the next image element data are to be stored since the value of the ternary counter C2 is zero (0). Since the BUFBSY output of the buffer B1 is "0", the output of the monitor circuit S is "1" and the buffer B1 applies "1" to the AND gate A1.

At this moment, since the Q output of the flip-flop F0 has been switched to "1" by the rear edge of the preceding main scanning synchronizing pulse PI2 as shown in FIG. 5 (III), the AND gate A2 is opened. Therefore, the input mode is started again by the main scanning synchronizing pulse PI3 of FIG. 5. When the input mode is initiated, the value of the binary counter C1 is returned from 1 to zero (0) and the value of the ternary counter C2 changes from zero (0) to 1 and the buffer (B1$\alpha$) performs the memory operation. The memory operation of the buffer (B1$\alpha$) is similar to that of the buffer (B0$\alpha$). The only difference between them is that in the case of the buffer (B1$\alpha$), the memory write pulse WP is not applied to the buffer B0, but applied to the buffer B1 by the memory write pulse distributing gate PD. Thus, the image element data for six lines are successively stored in the buffer (B0$\alpha$), the buffer (B0$\alpha$), the buffer (B1$\alpha$), the buffer (B1$\beta$), the buffer (B2$\alpha$) and the buffer (B2$\beta$). In practice, this is for six lines after the initial reset.

This is because the period of the main scanning synchronizing pulse PI is always set shorter than the minimum interval of the data requesting pulse P0. In other words, it is necessary that the scanning time of the scanner for one line be always shorter than the interval of the data requesting pulse P0. If this relationship is reversed, the scanner cannot come up with the data request from the data compression apparatus.

Therefore, when the buffer input mode has been conducted, and the buffer output mode has not been conducted, so that the buffer apparatus is filled with the image element data and new lines cannot be stored therein the read scanning is suspended accordingly.

This is, for example, a state of FIG. 5, in which the storing of the image element data in the buffer B2 has been finished, but the pick-up of the image element data from the buffers (B0α) and (B0β) is not finished yet, so that the application of image element data to the buffer B0 cannot be started.

At this time, the output operation of the buffer B0 can be carried out by the data requesting pulse P01 as shown in FIG. 5 (VI).

However, the BUFBSY output of the buffer B0 is "1" at the moment. Therefore, the output of the buffer monitor circuit S becomes "0" and even if the Q output of the flip-flop F0 is "1", the output of the AND gate A1 is "0".

On the other hand, since the value of the binary counter C1 is "1", the two inputs of the OR gate O1 are both zero (0) and the AND gate A2 remains closed.

Therefore, even if the main scanning synchronizing pulse P17 of FIG. 5 is applied to the AND gate A2, the input mode is not initiated, since the output of the AND gate A is "0".

Furthermore, when the pulse PI8 of FIG. 5 is applied, the Q output of the flip-flop F0 is "0". Therefore, the AND gate A2 remains closed so that the input operation of the buffer apparatus is not started even by the pulse PI8.

However, at the input of the pulse PI9 of FIG. 5 when the output operation of the buffers (B0α) and (B0β) has been completed, since a memory full flag of the flip-flop 13 of the buffer B0 is not set up and the output enable signal OUTENA is not generated for the buffer B0, the BUFBSY output of the buffer B0 is "0". Therefore, as in the case of the previously mentioned PI1, the input mode is initiated by the pulse PI9.

As mentioned above, the input mode of the buffer apparatus is performed with two lines at a time and the starting of the input mode of the buffer apparatus is conducted in accordance with the main scanning synchronizing pulse PI only when the Q output of the flip-flop F0 is "1" and a designated memory buffer is empty. Even if the Q output of the flip-flop F0 is "1", the input mode of the buffer apparatus is not started unless the designated buffer is empty. Furthermore, if the input mode of the buffer apparatus is not started when the Q output of the flip-flop F0 is "1", the flip-flop F0 is reversed to "0" by the rear edge of the main scanning synchronizing pulse PI at the moment. Therefore, the input mode of the buffer apparatus is not started, either, even if the next main scanning synchronizing pulse PI is applied to the flip-flop F0.

Therefore, the start and stop of the input mode are effected every other line. On the other hand, the subscanning pulse motor is driven only when the buffer apparatus is in operation in the input mode.

Therefore, the period of the drive time and that of the stop time of the pulse motor are respectively twice or an integer times the period of the main scanning synchronizing pulse PI so that the subscanning pulse motor is redriven after the hunting period of the subscanning pulse motor has passed, whereby the subscanning at the resumption of the scanning is improved.

The operation of the buffer apparatus in the output mode will now be explained.

As shown in FIG. 5 (II), the data requesting pulse P0 from the data compression apparatus is applied in nonsynchronism with the main scanning synchronizing pulse PI. And as mentioned previously, the period of the main scanning synchronizing pulse PI is shorter than the minimum interval of the generation of the data requesting pulse P0.

During the minimum period of the main scanning synchronizing pulse PI for four lines after the initial reset, the data compression apparatus has to be controlled so that the data requesting pulse P0 does not come out. Otherwise, the output of the image element data from the buffer B0 is initiated before the buffer B0 is filled with the image element data.

The output mode of the buffer apparatus is started unconditionally when the data requesting pulse P0 is applied to the buffer apparatus.

By the data requesting pulse P0, the flip-flop F2 is set and the increment of the binary counter C3 is effected and, at the same time, the output address counter OA is reset. Initially, since the value of the binary counter C3 is 1, the value of the binary counter C3 is returned from 1 to zero (0) by the data requesting pulse P01. At this moment, the increment of the ternary counter C4 is effected so that the value of the ternary counter C4 is returned from its maximum value of 2 to zero (0). Therefore, as in the case of the binary counter C1 and the ternary counter C3 in the input mode, the buffer (B0α) is designated for effecting the output operation.

To be more specifically, the ternary counter C4 chooses the buffer B0 through the output enable distributing gate OD. The binary counter C3 makes the MSB of the buffer memory 12 zero (0) through the address switching gate 11 within the buffer B0.

On the other hand, the flip-flop F2 is reset and the Q output is set at "1", whereby the output of the output enable distributing gate OD to be applied to the buffer B0 is set at "1".

Furthermore, the output address counter OA is set at the address zero (0) by the data requesting pulse P01.

Therefore, the image element data of the address zero (0) stored in the buffer (B0α) are applied to the data compression apparatus through the OR gate O.

When the data output clock CLKO is produced, it is applied to the output address counter OA through the AND gate A4 so that the increment of one address of the memory address is effected. Thus, the output image element data are sent to the data compression apparatus from the OR gate O in the synchronism with the data output clock.

When the output address counter OA reaches its maximum value, it produces a carry output, which is reversed by the inverter I3 and is applied to the D input of the flip-flop F2. The flip-flop F2 is triggered by the next data output clock CLKO and its Q output becomes "0", whereby the output of the image element data for one line is completed.

Unlike in the input mode, the processing of the image element data is not conducted with a pair of lines at a time in the output mode, but the image element data are simply produced line by line.

However, each buffer has one set of memory portions α and β for two lines and the buffer B0 has only one flip-flop 13. Therefore, the flip-flop 13 is reset when the output enable signal OUTENA is "1" and the buffer (B0β) is set in the output mode. Therefore, the flip-flop 13 is not reset by the output mode of the buffer (B0α). Thus, in the output mode, the image element data are produced line by line. This applies to the output of the buffers B1 and B2.

Figure 13:
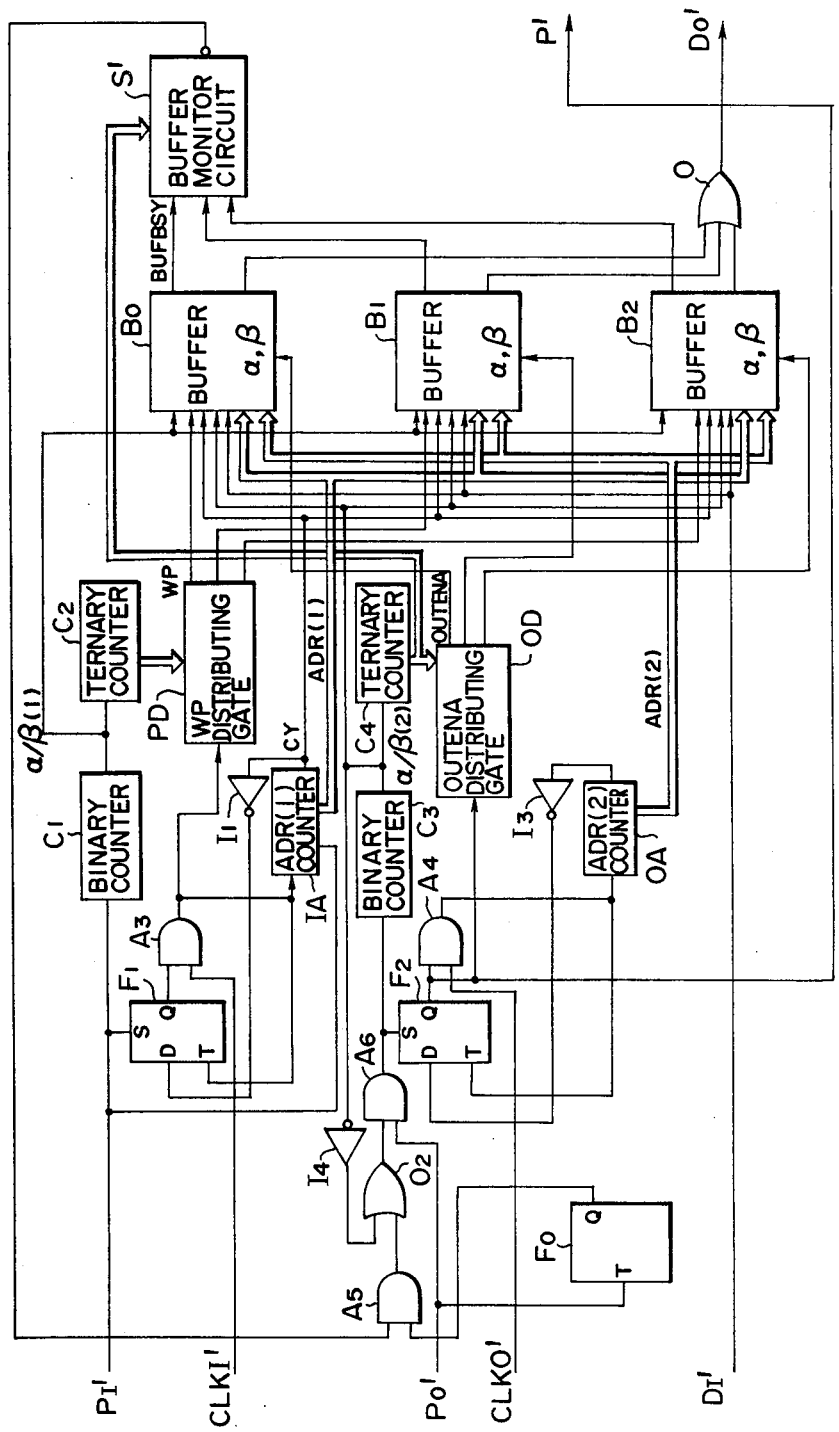
FIG. 13 is a more specific block diagram of the buffer apparatus of FIG. 6.

FIG. 13 shows the specific construction of the buffer apparatus of a facsimile apparatus on the reception side. In the figure, the same reference symbols as those in FIG. 9 indicate the same or equivalent members or apparatuses as those in FIG. 9.

The differences between the construction of the buffer apparatus of FIG. 13 and that of the buffer apparatus of FIG. 9 are as follows:

In the buffer apparatus of FIG. 13, the buffer monitor circuit S′ monitors the buffer full output FULL of the buffers B0 through B2 and when the buffer full output FULL of the buffer monitor circuit S′ becomes "1", the buffer monitor circuit S′ applies the buffer full output FULL or the buffer busy output BSY to an AND gate A5. The AND gate A5, OR gate O2, an AND gate A6, and an inverter I4 in FIG. 13, respectively function in the same manner as the AND gate A1, the OR gate O1, the AND gate A2 and the inverter I2 in FIG. 9.

In the thus constructed buffer apparatus, the input operation and output operation of the image element data to and from the buffer apparatus are exactly opposite to those on the transmission side of FIG. 9. The image element data are stored in each buffer line by line in accordance with the input start pulse PI′ from a data expansion apparatus (not shown) and when the buffers for two lines, for example, the buffers (B0α) and (B0β), are filled with the image element data, the image element data for two lines are applied successively to a printer (not shown) in accordance with the main scanning synchronizing pulse P0′ from the printer side.

As a result, the record scanning of the printer is always performed with in units of 2 lines and the suspension period of the record scanning is two or more times the minimum period of the main scanning synchronizing pulse and the record scanning is resumed and the subscanning pulse motor is driven after the hunting period of the subscanning pulse motor has passed, whereby the subscanning at the resumption of the scanning is improved.

In the conventional facsimile system, with respect to the originals which tolerate low scanning line density, the data transmission is performed with a reduced scanning line density in order to increase the transmission efficiency. According to the present invention, it is simple to reduce the scanning line density to ½ and when the scanning line density is reduced to ½, the subscanning at the resumption of the scanning is improved.

Figure 14:
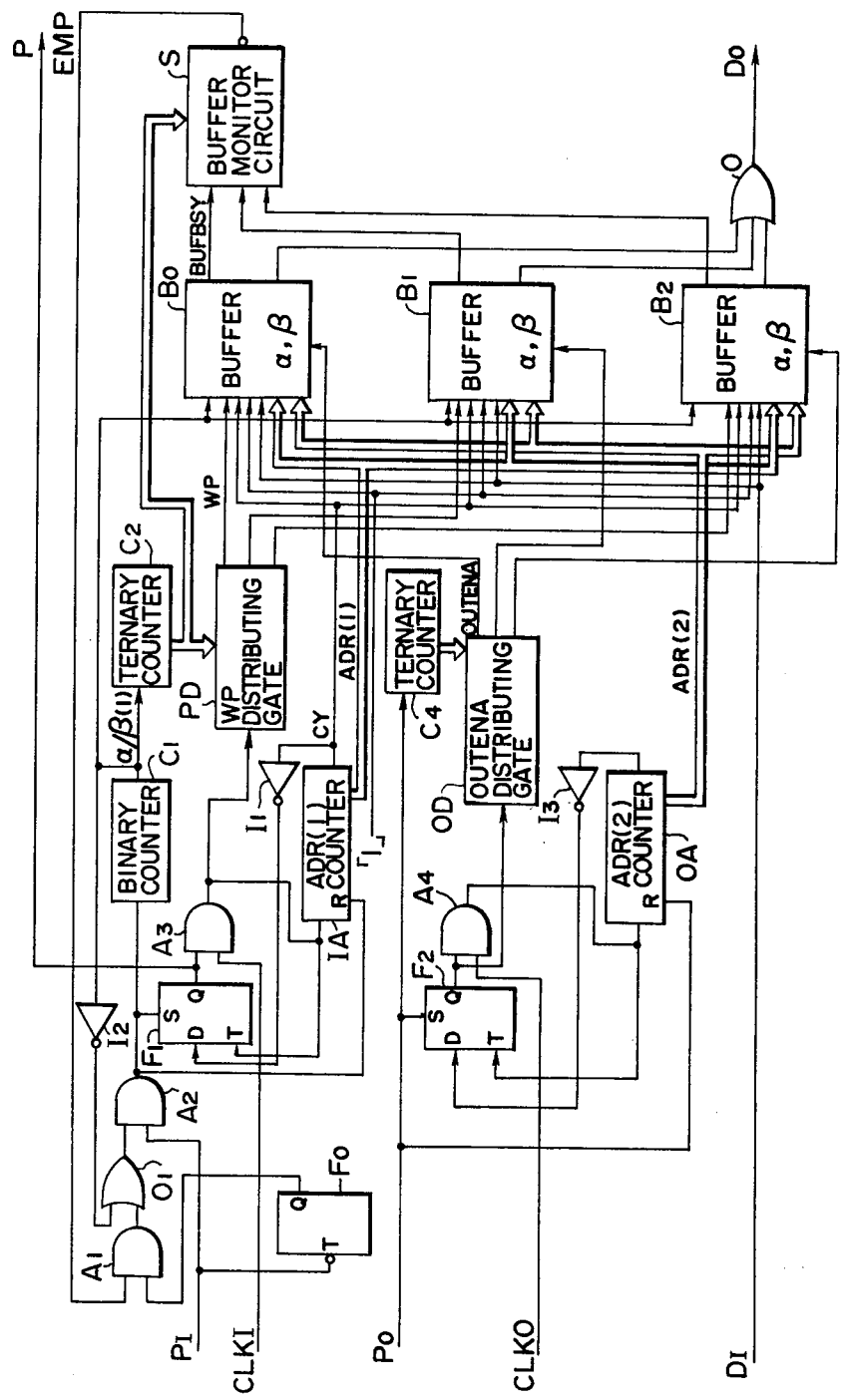
FIG. 14 is a more specific block diagram of the buffer apparatus of FIG. 7.

FIG. 14 is a block diagram of the specific construction of the buffer apparatus on the transmission side for reducing the scanning line density to ½.

In the figure, the same reference symbols as those in FIG. 9 indicate the same or equivalent members or apparatuses as those in FIG. 9. The differences between the construction of the buffer apparatus of FIG. 14 and that of the buffer apparatus of FIG. 9 are as follows:

In the buffer apparatus of FIG. 14, the binary counter C3 of FIG. 9 is eliminated and the data requesting pulse P0 is directly applied to the ternary counter C4. Furthermore, the memory portion β is chosen with a switching signal α/β (2) in the output mode to be applied to the data compression apparatus always set at "1".

In the thus constructed buffer apparatus, as in the case of the buffer apparatus of FIG. 9, the image element data are fed to the memory portions α and β of each buffer in the input mode and only the image element data stored in the memory portion β of each buffer are picked up therefrom in the output mode, with the output of the image element data stored in the memory portion α skipped.

In the output mode, the image element data for one line are processed in the data compression apparatus, taking time equivalent to the minimum transmission processing time for two lines.

As a result, the generation interval of the data requesting pulse Po becomes longer than the minimum read scanning time for two lines and the scanning resumption after the suspension of the read scanning always comes after a predetermined hunting period of the subscanning motor, whereby the subscanning at the resumption of the scanning is improved and a stable subscanning is always performed and good image quality is obtained.

Furthermore, it is unnecessary to change the read scanning and record scanning speeds at all. And the transmission efficiency can be increased, with the scanning line density reduced to ½, by a simple system wherein, when the image element data for one line are run-length coded by the data compression apparatus, if the compressed data of one line do not meet the transmission time for two periods of the main scanning, the image element data for one line are processed with supplementary bits added thereto, taking time equivalent to the minimum transmission processing time for two lines.

Suppose that the time for processing the image element data for one line by the scanner and by the printer is, for example, 5 ms and the image information density is so low that its transmission processing time is 5 ms or shorter when the image element data for one line read by the scanner is subjected to the data compression, the data transmission efficiency is not increased so much. However, when the transmission processing time is, for example, 8 ms, supplementary bits for 2 ms are added thereto and the image element data are transmitted, taking 10 ms of transmission processing time, whereby 6 ms of transmission processing time can be saved in comparison with the case where the image element data of 8 ms are transmitted in 16 ms for the transmission of two lines of the image element data.

Thus, in the case where the scanning line density is switched to ½, such switching of the scanning line density can be simply performed without changing the read scanning speed and the record scanning speed as in the conventional facsimile apparatus.

Furthermore, since it is unnecessary to change the read scanning and record scanning speeds, the hunting period and hunting amplitude of the subscanning pulse motor are not increased during the suspension of the scanning and the scanning is resumed after the minimum suspension period of the scanning for two lines has passed, so that the subscanning is surely improved in comparison with the conventional apparatus.

Figure 15:
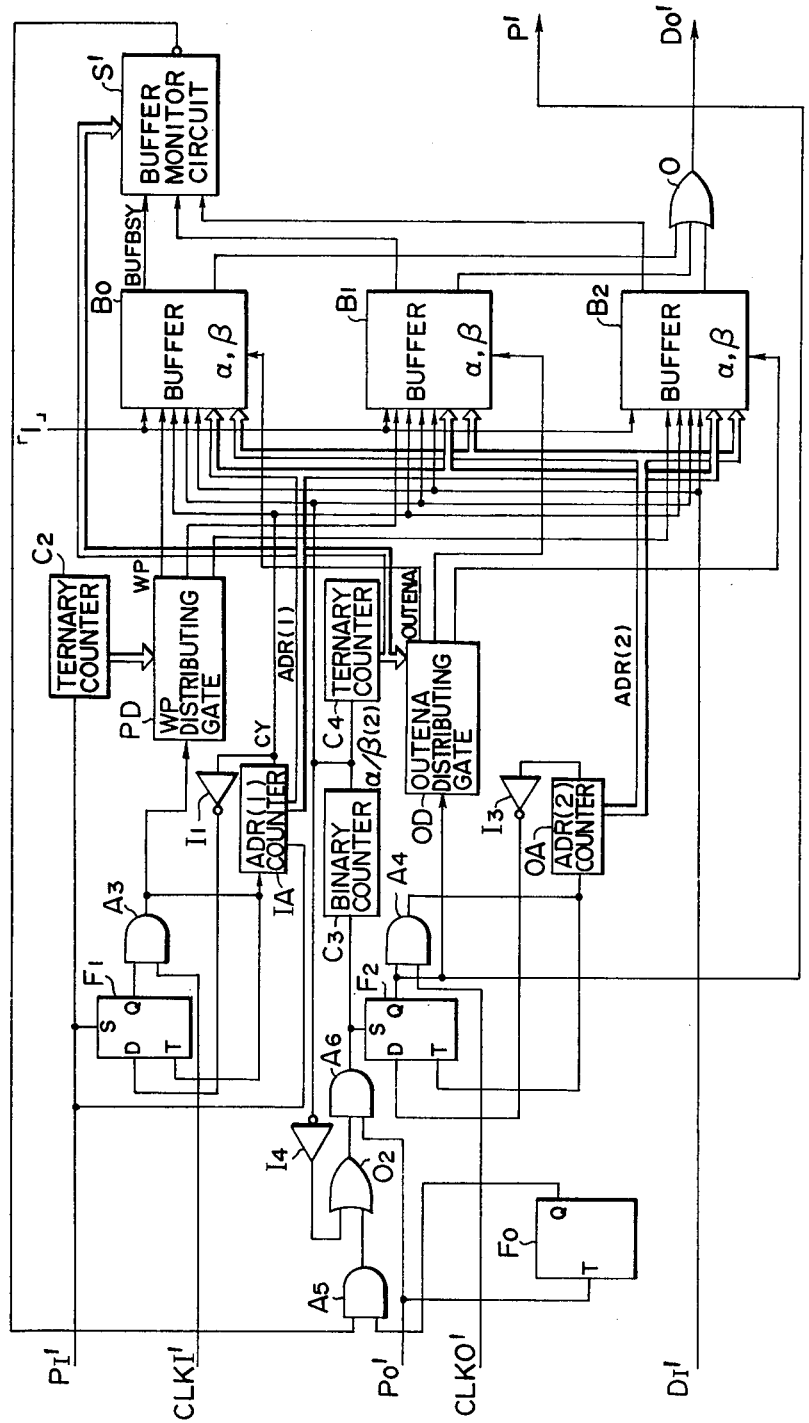
FIG. 15 is a more specific block diagram of the buffer apparatus of FIG. 8.

The image element data thus processed on the transmission side are processed by a buffer apparatus as shown in FIG. 15, with the same image element data written twice, so that a predetermined record image is obtained.

Figure 16:
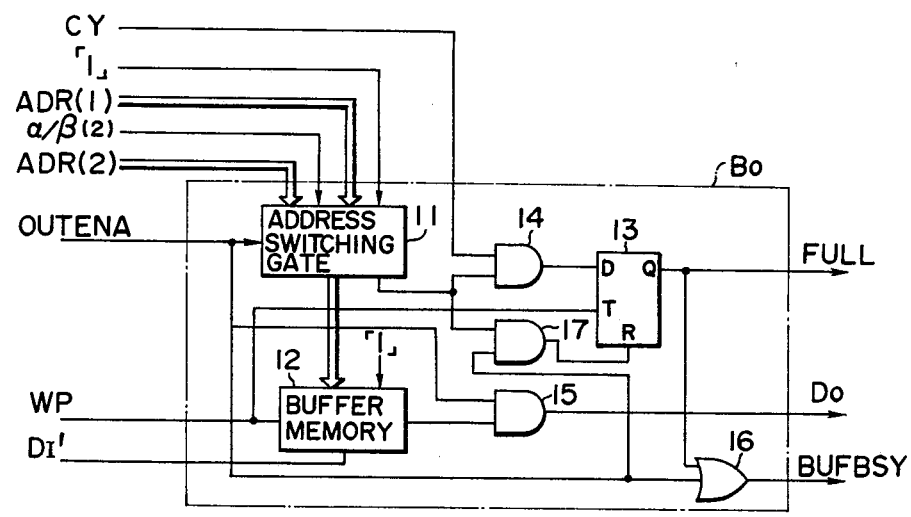
FIG. 16 is a more specific diagram of the buffer B0 of the buffer apparatus of FIG. 15.

FIG. 15 is a block diagram of the specific construction of the buffer apparatus on the reception side when the scanning line density is reduced to ½. In the figure, the same reference symbols as those in FIG. 13 indicate the same or equivalent members or apparatuses as those in FIG. 13. The differences between the construction of the buffer apparatus of FIG. 15 and that of the buffer apparatus of FIG. 13 are as follows:

In the buffer apparatus of FIG. 15, the binary counter C1 of FIG. 13 is eliminated and the input start pulse PI' is directly applied to the ternary counter C2. When the image element data DI' are applied to the buffer apparatus, the switching signal $\alpha/\beta$ (1) of FIG. 13 is set at "1" so that the image element data DI' are always stored in the memory portion $\beta$ of each of the buffers B0 through B2. As FIG. 16 shows the construction of each of the buffers B0 through B2, the switching signal of $\alpha/\beta$(1) of the memory 12 of the buffer shown in FIG. 10 is always set at "1".

The image element data, picked up every other line on the transmission side, are coded in the data compression apparatus and are then sent to the reception side.

The thus sent image element data are reconstructed by the data expansion apparatus to the original image element data on the reception side. At this time, the minimum processing time of the reconstructed image element data for one line is two times the processing time in the case where the scanning line density is "1".

When the input start pulse PI' is produced from the data expansion apparatus, the flip-flop F1 is set and the increment of the counter C2 is effected. The value of the counter C2 is returned from the initial value of 2 to zero (0), so that the buffer B0 is designated by the counter C2. On the other hand, since "1" is always applied to the address switching gate 11 of the buffer B0 shown in FIG. 16, the image element data DI', coming after the input start pulse PI', are stored in the memory portion $\beta$ of the buffer B, namely (B0$\beta$). When the image element data DI' have been stored in (B0$\beta$), the flip-flop 13 of FIG. 16 is set so that it produces the BUFBSY signal. In other words, even if only the image element data for one line are stored in the buffer B0, the buffer B0 becomes full so that it is possible to apply the stored image data from the buffer B0 to the printer.

Hereafter, the image element data for one line is successively stored likewise in the memory portion $\beta$ of each of the buffers B1 and B2.

On the other hand, when the buffer B0 is in the full condition, the BSY signal is produced from the buffer monitor circuit S' so that the AND gate A5 is opened.

If the output of the flip-flop F0 is "1" at this moment, the flip-flop F2 is set by the main scanning synchronizing pulse P0' produced from the printer and opens the AND gate A4 and the clock CLKO' is applied to the output address counter OA and in accordance with the address of the output address counter OA, the image element data for one line are successively applied to the printer.

At this moment, the value of the counter C3 and the value of the counter C4 are both zero (0) and the memory portion $\alpha$ of the buffer B0 is designated. However, since "1" is designated at the MSB of the memory 12 of the buffer B0 as shown in FIG. 16, the image element data for one line stored earlier in the buffer (B0$\beta$) are fed earlier therefrom to the printer.

In the next step, the same image element data for one line are again fed to the printer from the buffer (B0$\beta$) which is designated by the value of 1 of the counter C3 and the value of zero (0) of the counter C4 in accordance with the synchronizing pulse P0' which is produced from the printer after the image element data for one line have been fed to the printer.

The flip-flop 13 is reset by a reset signal sent through the gate 11 when the second OUTENA is generated.

Thus, the image element data for one line are fed to the printer twice and written twice.

As a result, even when the scanning line density is reduced to ½, the image element data are stored in each buffer, taking time equivalent to the processing time for two lines, so that the minimum suspension time of the record scanning is always longer than the record scanning time.

Further, since the circuit construction of this system does not need a particular modification of the circuits, the transmission and reception processing can be performed with the scanning line density reduced to ½ by simple switching of the circuits.

Furthermore, since it is unnecessary to change the pulse frequency of the subscanning in this case, this system is economical.

While specific embodiments of the invention have been shown and described in detail to illustrate the application of the principles of the invention, it will be understood that the invention may be embodied otherwise without departing from such principles.

What is claimed is:

1. In a facsimile system provided with at least a scanner, a printer, a buffer apparatus, a data compression apparatus and a data expansion apparatus, which performs read scanning, record scanning and transmission processing of image element data, line by line, using a subscanning pulse motor for subscanning, the improvement wherein the suspension time of said subscanning pulse motor for use in at least either the read scanning or the record scanning is set so as to be equivalent to a minimum scanning for two lines of said image element data.

2. In a facsimile system provided with at least a scanner, a printer, a buffer apparatus, a data compression apparatus and a data expansion apparatus, which performs read scanning, record scanning and transmission processing of image element data line by line, using a subscanning pulse motor for the subscanning, the improvement wherein said buffer apparatus is constructed so as to store therein the image element data obtained from said scanner, always in units of two lines, whereby the suspension time of said subscanning pulse motor is set to as to be equivalent to a minimum scanning time for two lines of said image element data.

3. A facsimile system as claimed in claim 2, wherein said buffer apparatus comprises a plurality of buffers, each of said buffers having a plurality of memory portions for storing therein image element data in units of one line of image element data, said buffers and said memory portions being successively chosen, and wherein the image element data obtained from said scanner are successively stored in each memory portion of said chosen buffers.

4. In a facsimile system provided with at least a scanner, a buffer apparatus, a data compression apparatus and a data expansion apparatus, which performs read scanning, record scanning and transmission processing of image element data line by line, using a subscanning pulse motor for subscanning, the improvement wherein said buffer apparatus is constructed so as to be capable of applying therefrom the image element data to said printer, always in units of two lines, whereby the suspension time of said subscanning pulse motor is set so as to be equivalent to a minimum scanning time for two lines of said image element data.

5. A facsimile system as claimed in claim 4, wherein said buffer apparatus comprises a plurality of buffers each of said buffers having a plurality of memory portions for storing therein image element data in units of one line of image element data, said buffers and said memory portions being successively chosen, and wherein the image element data stored in each of said memory portions are successively applied therefrom to said printer.

6. In a facsimile system provided with at least a scanner, a buffer apparatus, a data compression apparatus and a data expansion apparatus, which performs read scanning, record scanning and transmission processing of image element data, line by line, using a subscanning pulse motor for subscanning, the improvement wherein said buffer apparatus stores therein the image element data obtained from said scanner, always in units of two lines, and applies therefrom said image element data to said data compression apparatus with every other line and said image element data are processed for the transmission thereof in said data compression apparatus, taking time equivalent to two times a minimum transmission processing time, whereby the suspension time of said subscanning pulse motor is set so as to be equivalent to a minimum scanning time for two lines of said image element data.

7. A facsimile system as claimed in claim 6, wherein said buffer apparatus comprises a plurality of buffers, each of said buffers having a plurality of memory portions for storing therein image element data in units of one line of image element data, said buffers and said memory portions are successively chosen, and wherein the image element data obtained from said scanner are successively stored in each memory portion of said chosen buffers and one of said memory portions of said buffers is designated and said image element data are applied therefrom to said data compression apparatus.

* * * * *